(12) United States Patent
Stevenson

(10) Patent No.: US 7,059,579 B2
(45) Date of Patent: Jun. 13, 2006

(54) LATCHING VALVE FOR A TORQUE-TRANSMITTING MECHANISM IN A TRANSMISSION

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/975,890

(22) Filed: Oct. 28, 2004

(65) Prior Publication Data

US 2006/0091340 A1    May 4, 2006

(51) Int. Cl.
*F16K 31/143* (2006.01)
*F16K 31/383* (2006.01)
*R16K 31/363* (2006.01)

(52) U.S. Cl. .......................... 251/63; 251/63.5; 91/461
(58) Field of Classification Search .................. 251/62, 251/63, 63.5; 91/461
See application file for complete search history.

(56) References Cited

U.S. PATENT DOCUMENTS 3,898,862 A * 8/1975 Kerschbaumer et al. ...... 62/197
4,763,562 A * 8/1988 Haytayan ..................... 91/461

* cited by examiner

*Primary Examiner*—Edward K. Look
*Assistant Examiner*—John K. Fristoe, Jr.
(74) *Attorney, Agent, or Firm*—Christopher DeVries

(57) ABSTRACT

A torque-transmitting mechanism control valve disposed between a hydrostatic source of pressure and a torque-transmitting mechanism is effective to direct fluid pressure to engage the torque-transmitting mechanism when a control pressure is present, effective to retain the valve closed when source pressure is present but control pressure is not, and to retain the valve closed when torque-transmitting apply pressure is present and source pressure is not and control pressure is not present.

2 Claims, 2 Drawing Sheets

LATCHING VALVE FOR A TORQUE-TRANSMITTING MECHANISM IN A TRANSMISSION

TECHNICAL FIELD

This invention relates to apply control mechanisms for a torque-transmitting mechanism and, more particularly, to valve mechanisms within the apply mechanism to retain the torque-transmitting mechanism in the applied state.

BACKGROUND OF THE INVENTION

Automatic shifting power transmissions generally include a plurality of torque-transmitting mechanisms, such as clutches and brakes. These mechanisms are fluid applied mechanisms, which have a fluid source directed to the apply piston of the respective torque-transmitting mechanism. The fluid source is designed to have a plurality of control valves, which open and close to control the application of pressure to and from the torque-transmitting mechanism. When the torque-transmitting mechanism is to be applied, the valve is opened and fluid pressure is directed from a source of substantially constant apply pressure to return the torque-transmitting mechanism applied. When it is desired to release the torque-transmitting mechanism, the oil source at the torque-transmitting mechanism is decreased. These systems require that the source pressure be continuously made available to the valve mechanism in order to retain the torque-transmitting mechanism in the applied state.

SUMMARY OF THE INVENTION

It is an object of the present invention to provide a control valve mechanism which will retain the torque-transmitting mechanism in the applied state and permit the source oil to be removed.

In one aspect of the present invention, a reciprocable valve is disposed between a source of pressure and a torque-transmitting mechanism in which a plurality of diameters on the valve mechanism control the position of the valve.

In another aspect of the present invention, the valve mechanism includes two differential areas formed on the valve mechanism; one differential area is effective during application of pressure to the valve and the other differential area is effective during release of the apply pressure.

In yet another aspect of the present invention, a control differential area is provided to permit control fluid to open the valve mechanism during torque-transmitting mechanism apply or torque-transmitting mechanism release.

In still another aspect of the present invention, a valve member has a seal area having an inner diameter and an outer diameter wherein the outer diameter is effective to balance the valve during torque-transmitting mechanism apply and the inner diameter is effective as a control area during torque-transmitting mechanism release.

The latching valve, which is a component of the present invention, is designed to be used with a transmission electric motor applied clutch (TEMAC), which, in turn, is utilized to engage and disengage a hydrostatic applied clutch (HAC). The application of a HAC requires that the valve mechanism is essentially leak proof so that the clutch can be retained engaged for long periods, that must maintain a seal between the master cylinder apply mechanism at high pressure and the clutch at low pressure, must maintain a seal with the clutch pressure at a high pressure and the master cylinder or apply piston at a low pressure, and must open flow from the master cylinder to or from the clutch with a flow pressure control signal.

With this invention, it is preferable to use elastomeric seals, such as O-rings, to obtain the zero leakage requirement with the opening and closing function using a face seal to prevent the inadvertent cutting of the seal. This use of a face seal permits the inner diameter of the face seal to be effective in one direction of clutch pressure application and the outer diameter of the face seal to be effective in the other direction of clutch pressure application.

DESCRIPTION OF THE EXEMPLARY EMBODIMENTS

Figure 1:
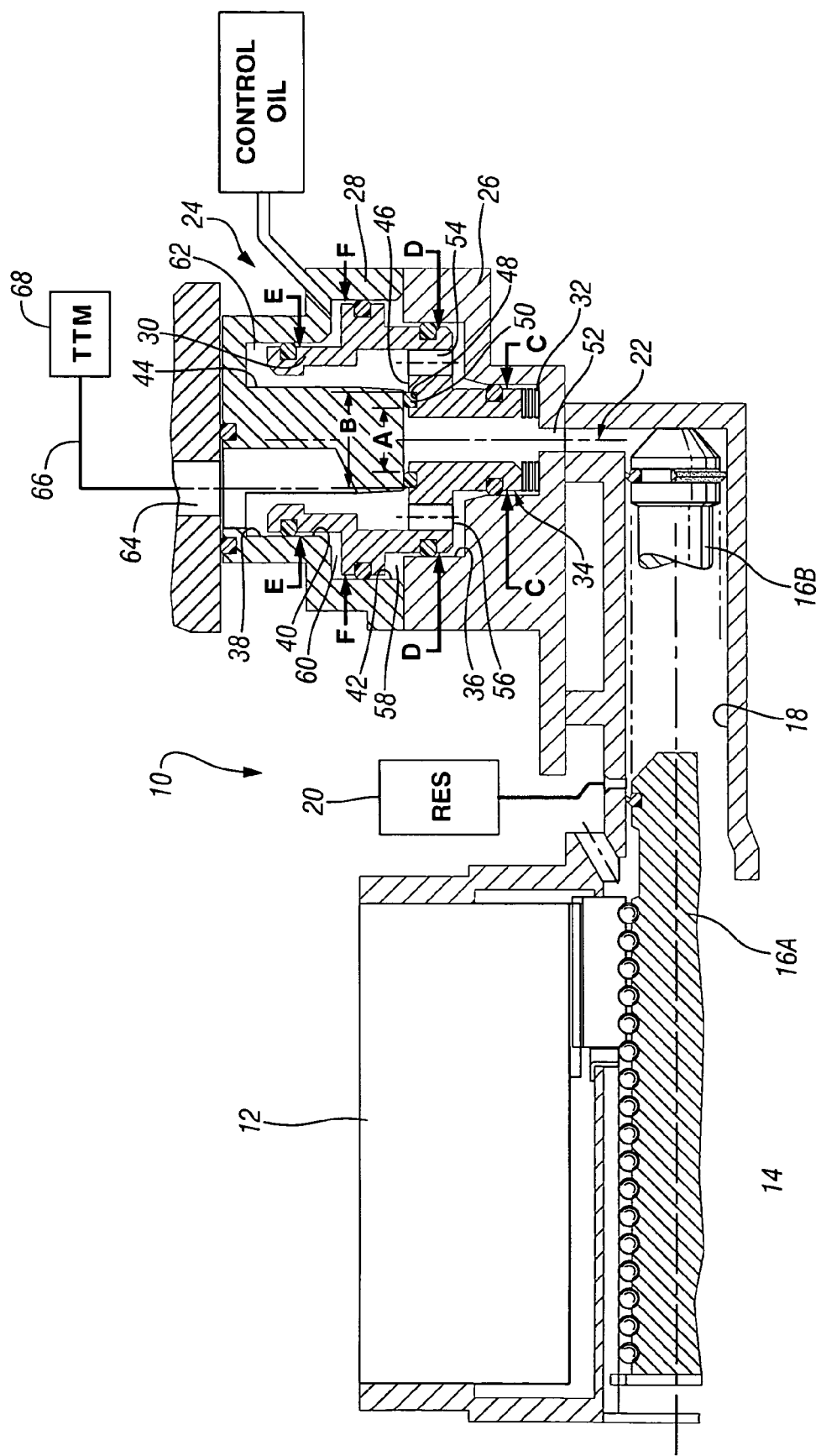
FIG. 1 is a partial elevational view describing a hydraulic control mechanism incorporating the present invention.

Referring to the drawings, wherein like characters represent the same or corresponding parts throughout the several views, there is seen in FIG. 1 a transmission electric motor apply clutch (TEMAC) mechanism 10. The TEMAC 10 includes an electric motor 12, which is connected to a ball-nut screw actuator 14 to a longitudinally movable piston 16. The piston 16 is disposed in a cylinder or chamber 18, which is connected with a fluid reservoir 20. In the retracted position 16A of the movable piston 16, the chamber 18 is open to the reservoir 20 such that fluid will fill the cylinder 18. In the fully extended position 16B of the movable piston 16, the fluid within the cylinder 18 has been expelled through a passage 22.

A control valve 24 is communicating with the passage 22. The control valve 24 has a pair of housing members 26, 28 in which is slidably disposed a multi-diameter valve 30. The valve 30 is urged upwardly as viewed in FIG. 1 by a control spring 32. The valve 30 has a first diameter C disposed in a bore 34 formed in the housing 26, a second diameter D formed in a bore 36 formed in the housing 26, a third diameter E disposed in a bore 38 formed in the housing 28, and a fourth diameter F disposed in a bore 42 formed in the housing 28. The housing 28 has a substantially central post member 44, which is disposed adjacent a face 46 of the valve 30.

The face 46 has formed therein a groove 48 in which is disposed an elastomeric O-ring face seal 50. The groove 48 has an innermost diameter A and an outermost diameter B. The valve 30 has six controlling diameters A, B, C, D, E, and F. The valve 30 has a passage 52, which communicates with the passage 22 and directs pressurized fluid from the chamber 18. The valve 30 also has a plurality of openings 54, which communicate between the face 46 and a volume or area 56 formed between the valve 30 and the housing 26. The area 56 is defined by the difference between the area of diameter C and the area of diameter D.

A volume or area 58 formed by the housing members 26, 28 and the valve 30 is defined by the difference between the diameter D and the diameter F. This volume is connected with exhaust and is therefore unpressurized at all times. A volume or area 60 is formed between the valve 30 and the housing 28. This volume or area 60 is defined by the areas of the diameters E and F. A volume or area 62 is formed in the housing 28 and is present at the end of the area defined by the diameter E.

A clutch apply port 64 directs fluid pressure to a passage 66, which communicates with a torque-transmitting mechanism 68, which, of course, may be either a clutch or a brake, and for the present disclosure is referred to as a clutch. When it is desired to engage the clutch 68, a control oil is distributed to the area or volume 60 between the diameters E and F to urge the valve 30 against the spring 32 such that fluid pressure generated by movement of the piston 16 from the position 16A to the position of 16B can produce pressurized oil flow through the passage 52 through the area between the post 44 and the face 46 to the openings 54 and port 64 and passage 66 to the clutch 68.

When the control oil pressure is not available at the area 60, the pressurized fluid, created by the piston 16, will be present on both of the areas of diameter C and diameter B, which are equal, and the valve 30 will not be opened. When control oil pressure is present, the valve 30 is opened and pressurized fluid flows from the chamber 18 through the valve 30 to the port 64 and passage 66 to thereby engage the clutch 68. When the clutch 68 is fully engaged and the control pressure is exhausted, the piston 16 can be retracted, from the position 16B to the position 16A, without a change in pressure at the clutch 68. The pressure in the passage 22 will, however, be reduced.

When the valve 30 is seated on the post 44 and fluid pressure is available at the opening 54, the pressure will be effective to the diameter A. The differential area between the diameter A and the diameter E is equal to the differential area between the diameter C and the diameter D. The differential area from diameter C to diameter D is directed to close the valve 30 while the pressure effective at the differential area between diameter A and diameter E is effective to urge the valve 30 to open. The valve 30 is retained or moved to closed by the spring 32 when the control oil pressure is released from the volume 60. The valve 30 with its elastomeric seals, which are present at diameters C, D, E, and F as well as the face seal 50, will prevent leakage from the torque-transmitting mechanism 68 back through the valve 30 to the chamber 18. Therefore, the valve 30 is maintained in the closed position with the clutch 68 engaged by the spring 32. When it is desired to release the clutch 68, control oil is again applied to the volume 60, thereby creating a differential force which will overcome the spring 32 to open the face seal 50 between the face 46 and the post 44 to permit the fluid in the clutch 68 to be exhausted back through the chamber 18 to the reservoir 20.

It should be apparent that fluid pressure administered by the piston 16 cannot reach the torque-transmitting mechanism 68 unless control oil pressure is present at volume 60 due to the balance between the areas formed by the diameter C and the diameter B. Thus, pressure can be developed in chamber 16 for other uses without affecting clutch 68. It should also now be apparent that once the torque-transmitting mechanism or clutch 68 has been fully engaged and the control oil pressure released at volume 60, the pressures operating on the differential area formed by diameters E and A and the differential area formed by diameters D and C will be equal, and forces in opposite directions so that the spring 32 will retain the valve 30 closed and the torque-transmitting mechanism 68 engaged. Thus, the torque-transmitting mechanism 68 is engaged and the electric motor 12 can be deenergized to save power and improve the efficiency of the transmission. With the valve closed, either clutch or actuator pressure may be higher without affecting each other.

Figure 2:
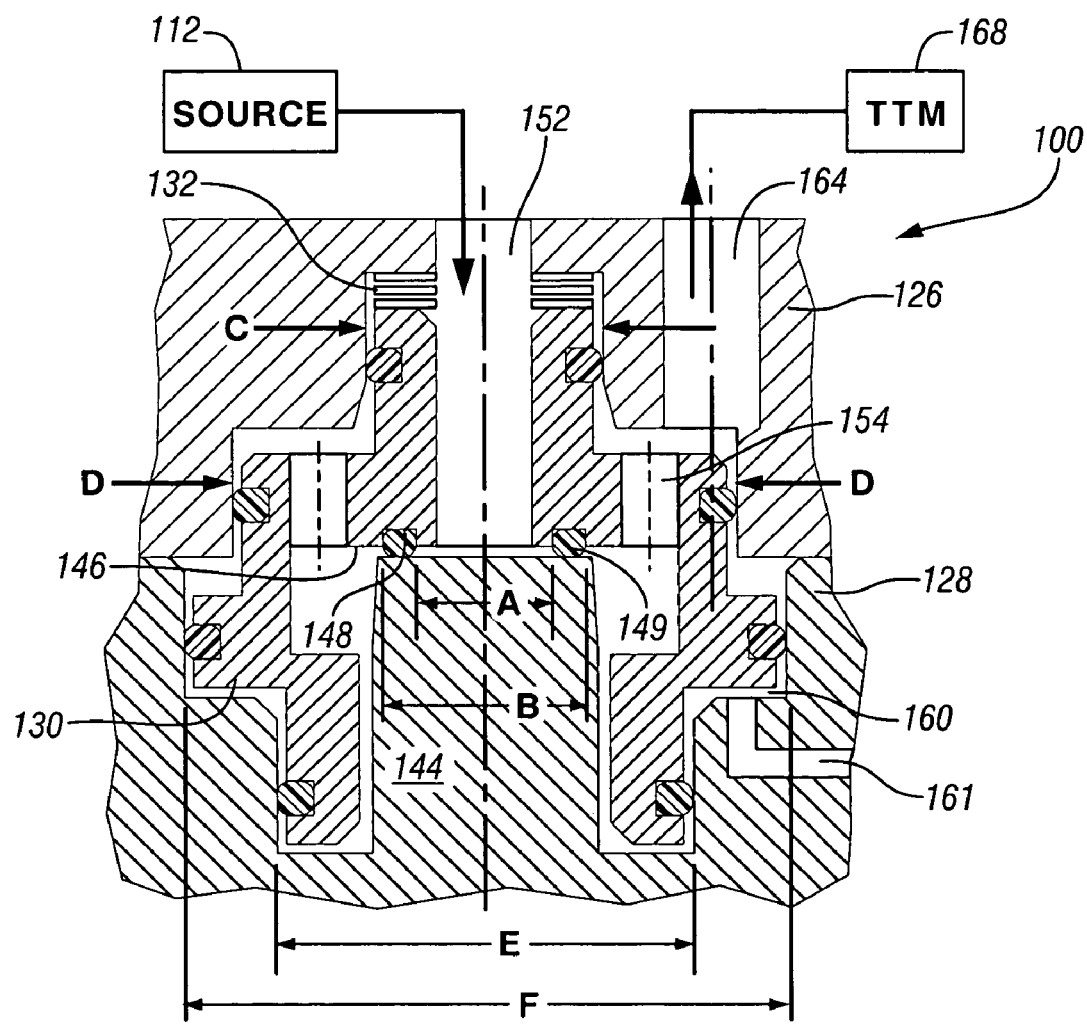
FIG. 2 is an elevational view of a valve element incorporating another embodiment of the present invention.

A valve 100 shown in FIG. 2 is similar to the valve 24 except that the feed to the clutch is taken out the same side as the feed from the pressure source. The valve 100 includes housings 126 and 128 in which is slidably disposed a valve element 130. The valve element 130 and the housings 126 and 128 cooperate to form diameters C, D, E, and F. The housing 128 has a post 144 which is disposed to abut a face 146 of the valve 130.

When fluid pressure is administered from a source 112, an O-ring face seal 149 is urged outwardly in a groove 148 such that area B is effectively pressurized. Since area B is equal to area C, a spring 132 will maintain the valve 130 against the post 144, thereby preventing fluid pressure from passing outwardly from a passage 152. However, when a pressure control signal is administered to a passage 161 to a chamber 160, an additional upward force or opening force is applied to the valve 130, which will permit fluid communication between the passage 152, a plurality of passages 156, and a clutch feed passage 164. This will permit the energization or actuation of the torque-transmitting mechanism or clutch 168.

When the fluid pressure from the source 112 is eliminated, for example, the piston 16 is withdrawn from the position 16B toward the position 16A, the pressure in the passage 152 and therefore the pressure at the face seal 149 will begin to reduce. However, the fluid pressure at the passages 154 will act across the face 146 to urge the seal 149 radially inward such that the diameter A is the effective or active diameter.

The differential area between diameter E and diameter A which produces an opening force for the valve 130 is equal to the differential area between the diameter D and the diameter C which produces a closing force for the valve 130. Therefore, with the control pressure at the chamber 160 removed, the spring 132 will hold the valve 130 closed against the post 144 such that the pressure within the clutch 168 will be held constant and the clutch engagement is retained. When it is desired to release the clutch, control pressure is again administered through the passage 161 to the chamber 160, thereby providing an unbalancing force which will open the valve 130 and permit the oil or fluid within the clutch 168 to be relieved through the valve 130, thereby releasing the clutch from engagement. Since the motor 12 is relieved of any pressurizing duties after clutch engagement is complete, the energy utilized by the control system is reduced, thereby improving the overall efficiency of the transmission.

The use of electric motor apply mechanisms is well known and described in much of the prior art. It should be considered that as disclosed in other patents, the control system described above can be utilized in many applications and more than one application in a given transmission. For example, if a power transmission has five stationary torque-transmitting mechanisms including clutches and brakes, five such systems be employed to control the engagement and disengagement of the torque-transmitting mechanisms.

The invention claimed is:

1. A control mechanism for a selectively engageable torque-transmitting mechanism comprising:
   a source of fluid pressure;
   a control valve mechanism disposed between said source of fluid pressure and said torque-transmitting mechanism;
   said control valve mechanism defining a first pair of diametrical portions on said valve to hydraulically balance said valve toward an open position when pressure is applied from said source and a control pressure is available at said valve, and a second pair of diametrical portions providing a balancing force on said control valve toward a closed position when said torque-transmitting mechanism is engaged and said source pressure is reduced and said control pressure is not present, said first and second pairs of diametrical portions being equal in area; and spring means to urge said valve mechanism to the closed position when said first and second pairs of diametrical portions are pressurized and said control pressure is not present.

2. The control valve defined in claim 1 further comprising:

a mechanism being slidably disposed in a valve housing having a flat surface formed thereon;

said valve mechanism having a flat face disposed adjacent said flat surface and cooperating therewith to form a face seal;

an elastomeric seal disposed in a groove formed in one of said face and surface to provide an inner diameter and an outer diameter at said face seal;

said valve mechanism having a first diameter subjected to pressure from said source, a second and third diameter subjected to pressure from said torque-transmitting mechanism;

said first diameter and said outer diameter being of equal size and cooperating to balance said valve mechanism when said source pressure is applied and a control pressure is not available;

said second diameter and said inner diameter cooperating to balance forces generated at a differential area formed by said first diameter and said third diameter to retain said valve balanced when said torque-transmitting mechanism is applied and said source pressure is released and a control pressure is not available.

* * * * *